United States Patent
Bikumandla et al.

(10) Patent No.: US 9,772,398 B2
(45) Date of Patent: Sep. 26, 2017

(54) OPTICAL PROXIMITY SENSORS WITH RECONFIGURABLE PHOTODIODE ARRAY

(71) Applicant: Intersil Americas LLC, Milpitas, CA (US)

(72) Inventors: Manoj Bikumandla, San Jose, CA (US); Celine Baron, Campbell, CA (US)

(73) Assignee: INTERSIL AMERICAS LLC, Milpitas, CA (US)

( * ) Notice: Subject to any disclaimer, the term of this patent is extended or adjusted under 35 U.S.C. 154(b) by 280 days.

(21) Appl. No.: 14/523,202

(22) Filed: Oct. 24, 2014

(65) Prior Publication Data
US 2015/0378013 A1  Dec. 31, 2015

Related U.S. Application Data

(60) Provisional application No. 62/017,737, filed on Jun. 26, 2014.

(51) Int. Cl.
  *G01S 7/497* (2006.01)
  *G01S 17/02* (2006.01)

(52) U.S. Cl.
  CPC ............ *G01S 7/497* (2013.01); *G01S 17/026* (2013.01)

(58) Field of Classification Search
  CPC ........ G01S 7/497; G01S 17/026; G01S 17/02; G01S 17/06; G01S 7/486; G01S 7/4813; G01S 7/4863; G06F 3/0416
  USPC ........ 250/221, 208.1, 206.1; 356/4.01, 3.06; 345/175, 173
  See application file for complete search history.

(56) References Cited

U.S. PATENT DOCUMENTS

| | | | | |
|---|---|---|---|---|
| 5,723,866 A | * | 3/1998 | Hamilton, Jr. | ...... H01L 27/1465 250/370.01 |
| 7,780,089 B2 | * | 8/2010 | Wang | ...................... G06K 7/14 235/462.11 |
| 8,558,103 B2 | | 10/2013 | Gaul | |
| 2004/0252867 A1 | * | 12/2004 | Lan | ...................... G06K 9/0004 382/124 |
| 2010/0032557 A1 | * | 2/2010 | Schiller | .................... G01J 1/02 250/252.1 |

* cited by examiner

*Primary Examiner* — Que T Le
*Assistant Examiner* — Jennifer Bennett
(74) *Attorney, Agent, or Firm* — Foley & Lardner LLP; Mark J. Danielson

(57) ABSTRACT

Optical proximity sensors, methods for use therewith, and systems including optical proximity sensor are described herein. Such an optical proximity sensor includes a light source and a light detector, wherein the light detector includes a plurality of individually selectable photodiodes (PDs). During a calibration mode, individual PDs of the plurality of PDs of the light detector are tested to identify which PDs are crosstalk dominated. During an operation mode, the PDs of the light detector that were not identified as being crosstalk dominated are used to produce a light detection value or signal that is useful for detecting the presence, proximity and/or motion of an object within the sense region of the optical proximity sensor. By not using the PDs that were identified as being crosstalk dominated, the signal-to-noise ratio of the light detection value or signal is improved compared to if the crosstalk dominated PDs were also used.

17 Claims, 7 Drawing Sheets

OPTICAL PROXIMITY SENSORS WITH RECONFIGURABLE PHOTODIODE ARRAY

PRIORITY CLAIM

This application claims priority to U.S. Provisional Patent Application No. 62/017,737, filed Jun. 26, 2014, which is incorporated herein by reference.

BACKGROUND

Optical proximity sensors, which can also be referred to as optical proximity detectors, typically include a light source and an adjacent photosensitive light detector. Such optical proximity sensors can be used to detect the presence of an object, estimate proximity of an object and/or detect motion of an object, based on the magnitude of light originating from the light source that is reflected from an object and detected by the light detector. The value of these sensors has become more important with the advent of battery-operated handheld devices, such as mobile phones. For example, a fair amount of the energy from a mobile phone battery is used to drive the display, and there is value in turning off the display or backlight when the mobile phone or other device is brought to the user's ear (where it cannot be viewed anyway). Optical proximity sensors have been used for this, and many other applications.

For other examples, there are many other applications in which the presence of an object can be detected with an optical proximity sensor to advantage. These range from sensing when protective covers have been opened on machinery, paper has been positioned correctly in a printer, or an operator's hands are at risk near an operating machine. An optical proximity sensor can also be used as a simple touch or near-touch activated switch, and could be implemented in applications like keyboards or devices that have a plastic housing that is sealed but which allows the light from the source to pass through and be sensed by the detector on the return.

Light from the source to the detector that is not transmitted toward the target object, but rather is transmitted directly from the source to the detector, is an example of optical crosstalk that reduces the capability of the overall device to sense distance. Such light essentially propagates sideways within the package and is considered noise or "light leakage", and contains no information. To reduce and preferably prevent light leakage, and more generally optical crosstalk, an opaque light barrier is typically used to isolate the light source from the light detector. However, light barriers are often imperfect, resulting in light leaking under, over and/or through the barrier.

Optical proximity sensors are often used with (e.g., placed behind and/or covered by) a cover plate that is glass, plastic, or some other protective light transmissive material. For example, the cover plate can be the glass covering a screen of a mobile phone, portable music player or personal data assistant (PDA), or the plastic covering a screen of a laptop, netbook or tablet computer. When such a cover plate is placed over an optical proximity sensor, the optical proximity sensor is often susceptible to specular reflections. Specular reflections similarly reduce the capability of the overall device to sense proximity, since specular reflections are essentially noise that contain no information.

In view of the above, there has been a desire to minimize light being transmitted directly from a light source to a light detector, as well as to minimize specular reflections and/or other internally reflected light. More generally, there is a desire to minimize optical crosstalk and/or the adverse effects thereof. Conventional attempts to achieve these goals typically relate to modification of the mechanical/structural design of optical proximity sensors.

DETAILED DESCRIPTION

In the following detailed description, reference is made to the accompanying drawings that form a part hereof, and in which is shown by way of illustration specific illustrative embodiments. It is to be understood that other embodiments may be utilized and that mechanical and electrical changes may be made. The following detailed description is, therefore, not to be taken in a limiting sense. In the description that follows, like numerals or reference designators will be used to refer to like parts or elements throughout. In addition, the first digit of a reference number identifies the drawing in which the reference number first appears.

Figure 1A:
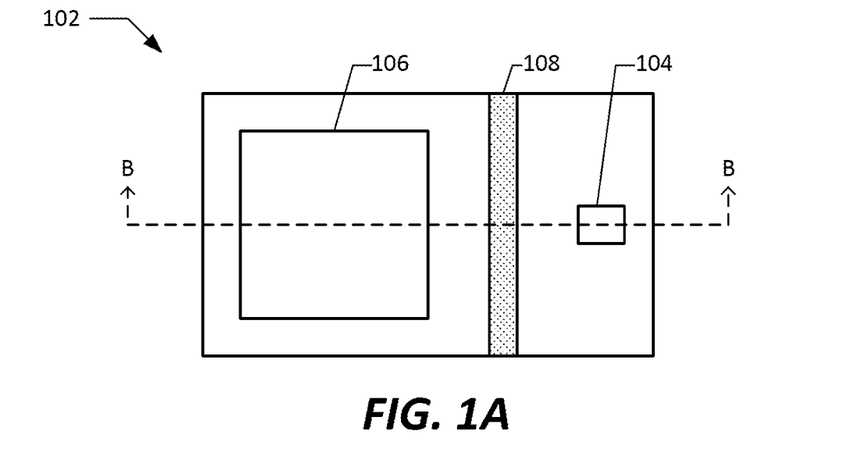
FIG. 1A shows a top view of an exemplary optical proximity sensor.
Figure 1B:
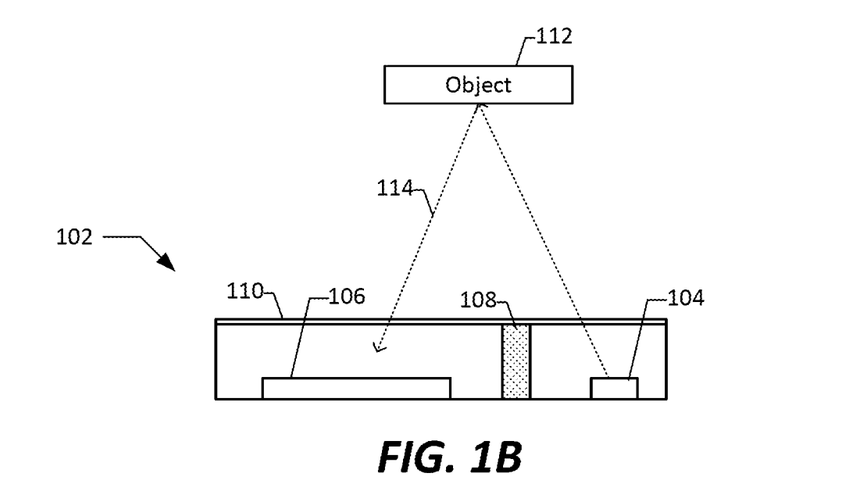
FIG. 1B shows a cross-section view of the optical proximity sensor shown in FIG. 1A, along the dashed line B-B in FIG. 1A.

FIG. 1A shows a top view of an exemplary optical proximity sensor 102, which can be used to detect the presence of an object, estimate proximity of an object and/or detect motion of an object within a sense region of the optical proximity sensor 102. FIG. 1B shows a cross-section view of the optical proximity sensor 102 shown in FIG. 1A, along the dashed line B-B in FIG. 1A. The optical proximity sensor 102 includes a light source 104 and a light detector 106, which are separated by one another by an opaque barrier 108. The optical proximity sensor 102 can optionally also include a glass or plastic cover plate 110. Alternatively, the optical proximity sensor 102 can be included in a device (e.g., a mobile phone or tablet computer) that includes a cover plate behind which the optical proximity sensor 102 is placed. Either way, the optical proximity sensor 102 can be covered by a cover plate 110 which may cause the light source 104 to detect specular reflections of light emitted by the light source 104. Traditionally, the light detector 106 of an optical proximity sensor, such as the optical proximity sensor 102, has been implemented as a single large photodiode, or an array or matrix of smaller photodiodes that are hardwired to one another to essentially function as a single large photodiode.

The light source 104 is selectively driven to emit light. If an object 112 is within the sense region of the optical proximity sensor 102, at least a portion of the light emitted by the light source 104 will be reflected off the object 112 and will be incident on the light detector 106. The light detector 106 generates an analog signal (e.g., a current) that is indicative of the intensity and/or phase of the light incident on the light detector 106, and thus, can be used to detect the presence of the object, estimate proximity of the object and/or detect motion of the object within the sense region of the optical proximity sensor 102. Such light can be generally referred to as light of interest or a signal of interest, and is represented by the dotted line 114 in FIG. 1B (as well as in FIG. 2B). The light that originates from the light source and is reflected by an object and is incident on and detected by the light detector can also be referred to as a return signal.

The light detector 106 can also detect light that is not of interest (at least with regard to detecting the proximity, presence and/or motion of the object 112) that can be caused by specular reflections and/or other internal reflections and/or light leaking under, over and/or through the barrier 108. Such light that is not of interest (at least with regard to detecting the proximity, presence and/or motion of the object 112), shall be generally referred to as optical crosstalk, but can also be referred to as interference light. Optical crosstalk degrades the signal to noise ratio (SNR) of an optical proximity sensor, and can reduce manufacturing yield where a percentage of manufactured optical proximity sensors do not meet predefined SNR requirements and thus must be scrapped. Embodiments of the present invention, which are described below, can be used to reduce adverse effects of optical crosstalk and increase yield, as will be appreciated from the following discussion. More specifically, certain embodiments described herein take advantage of the fact that optical crosstalk may be geographically localized to only a certain area (or only certain areas) of the light detector 106, as will be appreciated from the discussion below.

Figure 2A:
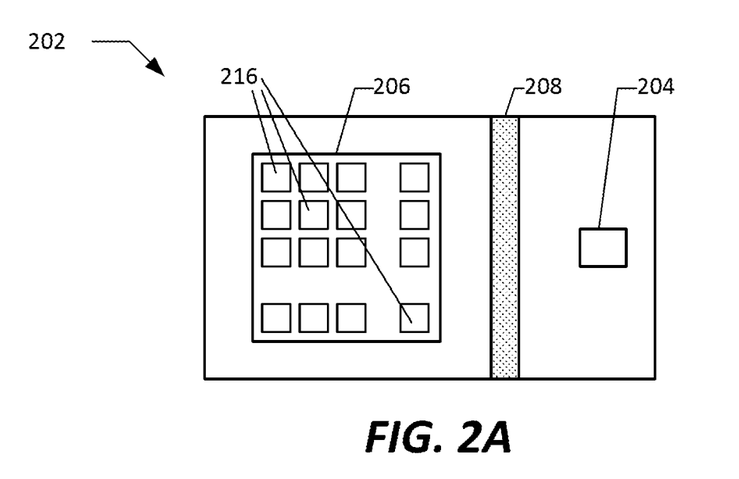
FIG. 2A shows a top view of an exemplary optical proximity sensor, according to an embodiment of the present invention.
Figure 2B:
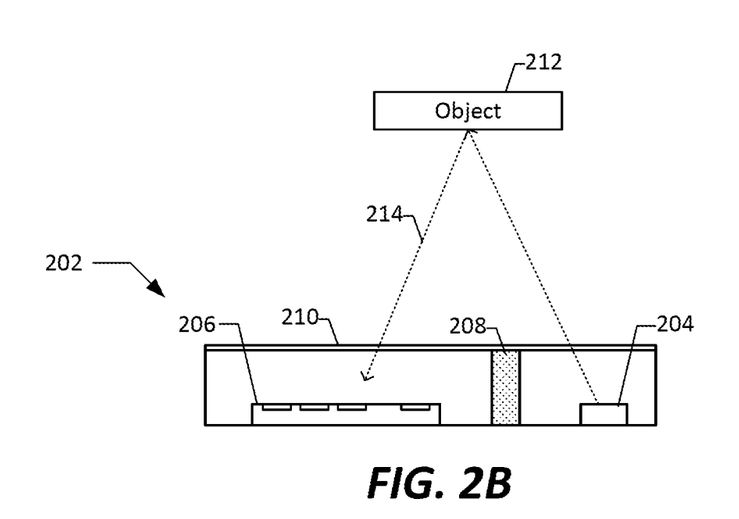
FIG. 2B shows a cross-section view of the optical proximity sensor shown in FIG. 2A, along the dashed line B-B in FIG. 2A.

FIG. 2A shows a top view of an exemplary optical proximity sensor 202, according to an embodiment of the present invention, which can be used to detect the presence of an object, estimate proximity of an object and/or detect motion of an object within a sense region of the optical proximity sensor. FIG. 2B shows a cross-section view of the optical proximity sensor 202 shown in FIG. 2A, along the dashed line B-B in FIG. 2A.

Referring to FIG. 2B, the optical proximity sensor 202 includes a light source 204 and a light detector 206, which are separated by one another by an opaque barrier 208. The optical proximity sensor 202 can optionally also include a glass or plastic cover plate 210, or can be included in a device that includes a cover plate behind which the optical proximity sensor 202 is placed. Either way, the optical proximity sensor 202 can be covered by a cover plate 210 which may cause the light source 204 to detect specular reflections of light emitted by the light source 204.

The light source 204 can include one or more light emitting element (e.g., one or more light emitting diode (LED) or laser diode, but not limited thereto) that emits infrared (IR) light, or light of some other wavelength. While infrared (IR) light sources are often employed in optical proximity sensors, because the human eye cannot detect IR light, the light source can alternatively produce light of other wavelengths.

The light detector 206 includes a plurality of individually selectable photodiodes (PDs) 216. More specifically, in accordance with an embodiment, the light detector 206 includes an array or matrix of PDs 216 that are not hard-wired to one another, and thus, can be individually selected.

The light source 204 is selectively driven to emit light. If an object 212 is within the sense region of the optical proximity sensor 202, at least a portion of the light emitted by the light source 204 will be reflected off the object 212 and will be incident on the PDs 216 of the light detector 206. Each of the PDs 216 of the light detector 206 generates an analog signal (e.g., a current) that is indicative of the intensity and/or phase of the light incident on the PD 216, and thus, can be used to detect the presence of the object 212, estimate proximity of the object 212 and/or detect motion of the object 212 within the sense region of the optical proximity sensor 202. Such light can be generally referred to as light of interest or a signal of interest, and is represented by the dotted line 214 in FIG. 2B.

The PDs 216 of the light detector 206 can also detect light that is not of interest (at least with regard to detecting the proximity, presence and/or motion of the object 212) that can be caused by specular reflections and/or other internal reflections and/or light leaking under, over and/or through the barrier 208. Such light that is not of interest (at least with regard to detecting the proximity, presence and/or motion of the object 212), shall be generally referred to as optical crosstalk, but can also be referred to as interference light. The embodiment of FIGS. 2A and 2B can be used to reduce detected optical crosstalk and increase yield, as will now be described.

Each of the PDs 216 of the light detector 206 would optimally produce no current when there is no object (e.g., 212) within a sense region of the optical proximity sensor 202 (the sense region may dependent on the field of view and range of the optical proximity sensor). However, each of the PDs 216 will likely produce some nominal dark current, which can be referred to as a dark current component. Additionally, at least some of the PDs 216 (i.e., one or more) will likely also generate current (in addition to the dark current) that is due to optical crosstalk, which can be referred to as a crosstalk current component.

In accordance with certain embodiments, those individual PDs 216 that produce an optical crosstalk component beyond a specified threshold are identified as crosstalk dominated PDs. In accordance with certain embodiments, the responses to the crosstalk dominated PDs are thereafter ignored, or the crosstalk dominated PDs are deactivated such that they don't produce a response, or such that they don't contribute to the overall signal produce by the light detector 206 or to the output of the optical proximity sensor 202. More generally, cross talk dominated PDs are not used, during an operational mode, to produce a value or signal that is useful for detecting the proximity, presence and/or motion of an object.

In accordance with an embodiment, a calibration procedure can be performed when there is no object within the sense region of the optical proximity sensor 202 to identify which PDs 216, if any, are crosstalk dominated PDs. Alternatively, the calibration procedure can be performed while the plurality of PDs 216 of the light detector 206 are covered by an opaque material. Either way, during the calibration procedure none of the light that is emitted by the light source 204 and exits the optical proximity sensor 202 should be detected by any of the PDs 216 of the light detector 206. This way, during the calibration procedure any light detected by the PDs 216 of the light detector 206 can be presumed to be due to optical crosstalk. The optical proximity sensor 202 can be said to be in a calibration mode during the calibration procedure. By contrast, when the optical proximity sensor 202 is being used to produce a light detection value or signal that is useful for detecting the proximity, presence and/or motion of the object, the optical proximity sensor 202 can be said to be in an operational mode.

In accordance with an embodiment, during the calibration procedure only one of the PDs 216 of the light detector 206 is selected at a time (e.g., sequentially) while the light source 204 is emitting light and a separate value indicative of the amount of light detected by the selected PD 216 is determined and stored in memory or registers (e.g., in a table) for each of the PDs. For example, a digital value can be produced, using an analog-to-digital converter (ADC), in dependence on a light detection signal (e.g., a current) produced by the selected PD 216. Depending upon implementation, such a light detection signal can be converted from a current to a voltage by a transimpedance amplifier (TIA) and/or amplified (e.g., by a programmable amplifier) before it is provided to the ADC. Thereafter, the PD(s) 216 having a value beyond a specified threshold can be determined to be unacceptably responsive to optical crosstalk, i.e., can be identified as being crosstalk dominated. During an operational mode of the optical proximity sensor 202, the responses to the crosstalk dominated PDs can be ignored, or the crosstalk dominated PDs can be deactivated such that they don't produce a response, or such that they don't contribute to the overall response of the light detector 206 or to the output of the optical proximity sensor 202. More generally, during the operational mode the cross talk dominated PDs are not used to produce the light detection value or signal that is useful for detecting the proximity, presence and/or motion of an object. Rather, only the PDs that are not cross talk dominated are used to produce such a light detection value or signal. In certain embodiments, the digital values produced during the calibration procedure are stored in a non-volatile type of memory so that the values are not lost when the system is powered-down.

The threshold (used to determine whether PDs are crosstalk dominated) can be predefined and fixed. Alternatively, the threshold can be programmable. In another embodiment, the threshold can be determined by the optical proximity sensor 202. For example, one or more calibration PDs can be covered by an opaque mask (e.g., a metal layer) such that no light should ever be incident on calibration PDs. Such calibration PDs will nevertheless produce a dark current, based on which a value can be determined and stored. The threshold can be specified to be equal to this value, equal to this value plus an offset, or equal to this value multiplied by a factor (e.g., 1.2), or the like.

The more PDs 216 that get deactivated or ignored, the less the total current produced by the light sensor 206. If the magnitude of the total current is used to detect proximity (i.e., distance between an object on the optical proximity sensor), this could be a problem, since proximity should not be effected by how many PDs are activated. To avoid this problem, the optical proximity sensor 202 can be designed such during operation of the optical proximity sensor 202 (in contrast to calibration of the optical proximity sensor) a first predefined number or percentage of PDs 216 are used or activated and a second predefined number or percentage of the PDs 216 are deactivated or ignored. For example, 90% of the PDs can be used or activated, and 10% can be deactivated or ignored. For a more specifically example, during the calibration procedure the 10% (or some other percent) of the PDs that are most effected by optical crosstalk can be identified and disabled or ignored during the operation mode. Alternatively, the gain of the total current produced by the used or activated PDs can be adjusted based on how many PDs are deactivated, ignored or otherwise not used to produce the light detection value or signal that is useful for detecting the proximity, presence and/or motion of an object. For example, if 10% of the PDs 216 of the light detector 206 are deactivated or ignored, then the total current produced by the used or activated PDs 216 can be amplified by 10%.

Figure 3:
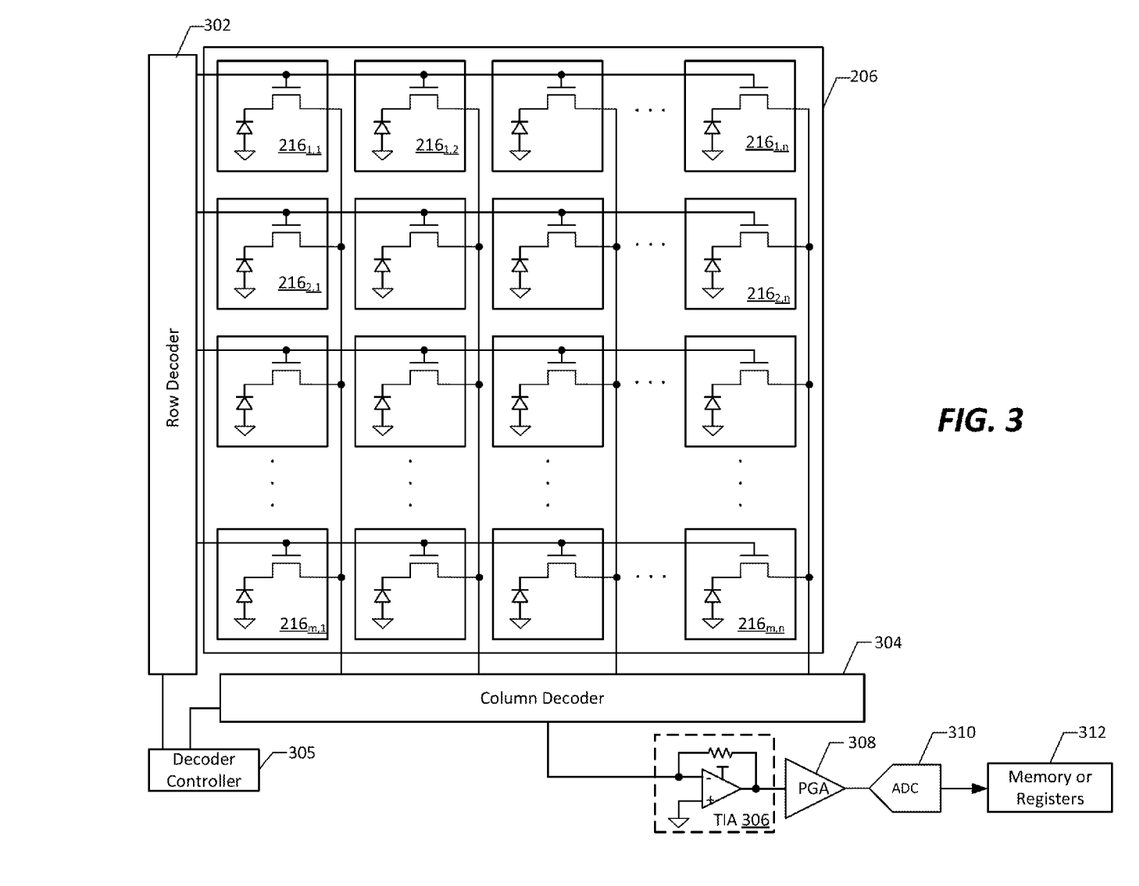
FIG. 3 illustrates additional details of the light detector of the optical proximity sensor of FIGS. 2A and 2B, according to an embodiment.

FIG. 3 illustrates additional details of the light detector 206, according to an embodiment of the present invention. Referring to FIG. 3, the light detector 206 is shown as including a matrix of PDs 216, and more specifically, m columns×n rows of PDs $216_{column,row}$. A row decoder 302 is used to select which row is selected by selectively turning on and off switching transistors associated with the PDs 216. A column decoder 304 is used to select which column is selected. A decoder controller 305, or some other controller, is used to control the row decoder 302 and the column decoder 304.

In accordance with an embodiment, each of the PDs 216 is selected, one at a time, during the calibration mode while the light source 204 is emitting light and a value indicative of the amount of light detected by the selected PD 216 is determined and stored in memory or registers 312 (e.g., in a table). More specifically, a current produced by the selected PD 216 is provided, by the column decoder 304, to a transimpedance amplifier (TIA) 306 that converts the current to a voltage. This voltage is optionally amplified by an amplifier 308 before it is provided to an ADC 312, which converts the voltage to a digital value that is stored in the memory or registers 312. The stored digital values can be compared (e.g., by one or more comparators or a processor) to a threshold used to identify which PDs 216 are crosstalk dominated. Thereafter, during operation of the optical proximity sensor 202 (as opposed to during the calibration mode), the responses to the crosstalk dominated PDs are ignored, or the crosstalk dominated PDs are deactivated such that they don't produce a response, or such that they don't contribute to the overall response of the light detector 206 or the output of the optical proximity sensor 202. More generally, during the operational mode the PDs that are crosstalk dominated are not used to produce a light detection value or signal that is useful for detecting the proximity, presence and/or motion of an object within the sense region of the light detector 206.

Each of the TIA 306, amplifier 308, ADC 312 and memory or registers 312 can be part of the optical proximity sensor 202, or one or more of these components can be external to the optical proximity sensor 202. Similarly, the decoder controller 305 can be part of the optical proximity sensor 202, or can be external to the optical proximity sensor 202. The optical proximity sensor 202 can also include a driver (not shown) for selectively driving the light source 204, or such a driver can be external to the optical proximity sensor 202. In accordance with an embodiment, the amplifier 308 can be controlled to adjust the amplitude of the signal provided to the ADC 310 to be substantially equal to a target amplitude in order to increase and preferably optimize the dynamic range of the ADC 310.

Figure 4:
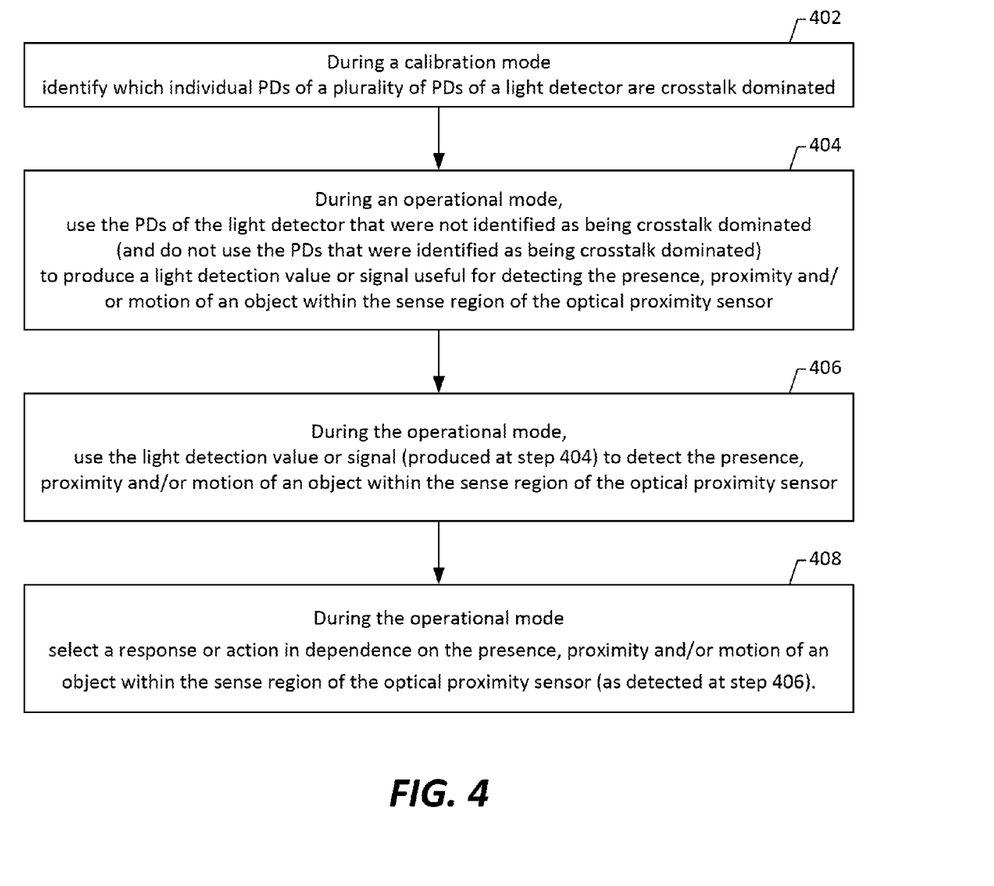
FIG. 4 is a high level flow diagram that is used to describe a method according to an embodiment of the present invention.

FIG. 4 is a high level flow diagram of a method for use with an optical proximity sensor, including a light source and a light detector, wherein the light detector includes a plurality of individually selectable photodiodes (PDs). An example of such an optical proximity sensor was described above with reference to FIGS. 2A, 2B and 3. Referring to FIG. 4, step 402 involves, during a calibration mode, identifying which individual PDs of the plurality of PDs of the light detector are crosstalk dominated. Details of step 402, according to an embodiment, are described below with reference to FIG. 5. Still referring to FIG. 4, step 404 involves, during an operational mode, using the PDs of the light detector that were not identified as being crosstalk dominated (and not using the PDs of the light detector that were identified as being crosstalk dominated) to produce a light detection value or signal that is useful for detecting the presence, proximity and/or motion of an object within the sense region of the optical proximity sensor. The sense region can be defined by a field of view (FOV) of the light detector and the range of the light detector, but is not limited thereto. Details of step 404, according to various embodiments, are described below with reference to FIGS. 6 and 7. Still referring to FIG. 4, step 406 involves, during the operational mode, using the light detection value or signal (produced at step 404) to detect the presence, proximity and/or motion of an object within the sense region of the optical proximity sensor.

The presence, proximity and/or motion of an object within the sense region can be detected using amplitude, phase and or time-of-flight (TOF) techniques, but are not limited thereto. If there is an object within the sense region (i.e., field of view and range) of the optical proximity sensor, infrared light (or other wavelength light) emitted by the light source will be reflected from the object, and a portion of the reflected infrared light will be incident on the light detector. In response to detecting light, the light detector is used to produce a light detection value or signal that is indicative of the magnitude and the phase of the detected light. The magnitude of the light detection signal can be dependent, e.g., on the distance between the object and the optical proximity sensor and the color of the object. In general, all other things being equal, the closer the object, the greater the magnitude of the light detection value or signal. Further, all other things being equal, if an object has a white color, or another highly reflective color, the magnitude of the light detection value or signal will be greater than if the object has a black color, or another lowly reflective color. By contrast, the phase of the light detection signal should be primarily dependent on the distance between the object and the optical proximity sensor, and should not depend on the color or reflectivity of the object.

While not shown in FIG. 2B or 3, one or more optical filter can be located in front of the light detector 206 to reflect and/or absorb wavelengths that are not of interest. For a more specific example, one or more optical filters can be used to reject ambient visible light and pass infrared light. Alternative and/or additional techniques for rejecting and/or compensating for ambient visible light can be used, as are known in the art.

Step 408 involves, during the operational mode, selecting a response or action in dependence on the presence, proximity and/or motion of an object within the sense region of the optical proximity sensor as detected at 406. This can include, e.g., selectively enabling or disabling a subsystem. Examples of such subsystems are described below with reference to FIG. 5.

Figure 5:
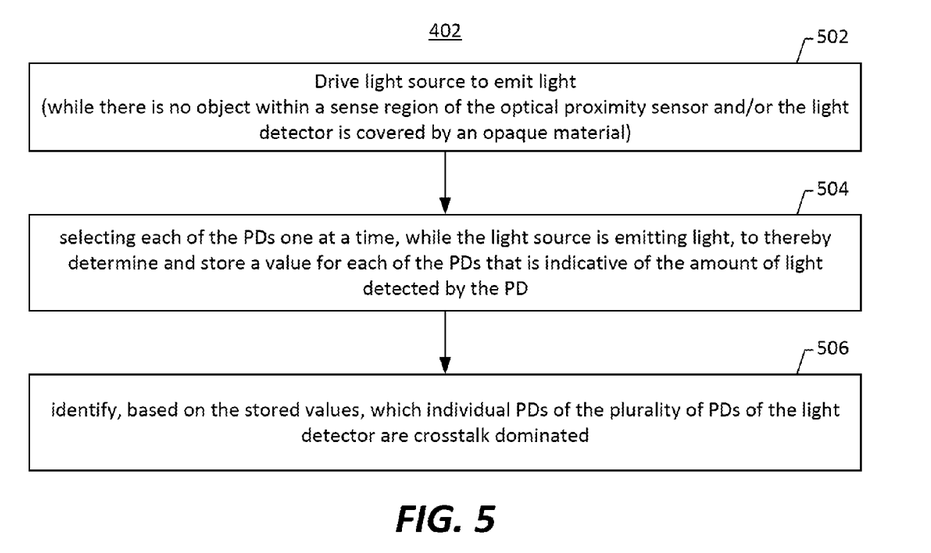
FIGS. 5, 6 and 7 are high level flow diagrams that is used to describe additional details of steps that were introduced in FIG. 4 according to various embodiments.

FIG. 5 is a high level flow diagram that provides additional details of step 402, introduced in FIG. 4, according to an embodiment. Each of the steps shown in FIG. 5 are performed during the calibration mode. Referring to FIG. 5, step 502 involves driving the light source to emit light. Step 504 involves selecting each of the PDs one at a time, while the light source is emitting light, to thereby determine and store a value for each of the PDs that is indicative of the amount of light detected by the PD. Step 506 involves identifying, based on the stored values, which individual PDs of the plurality of PDs of the light detector are crosstalk dominated. Step 506 can be achieved, as explained above, by comparing the stored values to a threshold value, and identifying as being crosstalk dominated each of the PDs whose stored value exceeds the threshold. The threshold can be a predetermined fixed value or a programmable value. Alternatively, as explained above, a value that corresponds to a dark current produced by a PD of the light detector can be determined, and the threshold value can be determined based on the value that corresponds to the dark current. For example, as explained above, the threshold can be specified to be equal to this value, equal to this value plus an offset, or equal to this value multiplied by a factor (e.g., 1.2), but is not limited thereto.

The row decoder 302, the column decoder 304 and the decoder controller 305 can be used to perform step 504. For example, while a row is selected, one column at a time can be selected to separately determine and store a value for each of the PDs in the row that is indicative of the amount of light detected by the PD. Thereafter, while a next row is selected, one column at a time can be selected to separately determine and store a value for each of the PDs in that row that is indicative of the amount of light detected by the PD. This can be repeated for each of the rows. For another example, while a column is selected, one row at a time can be selected to separately determine and store a value for each of the PDs in the column that is indicative of the amount of light detected by the PD. Thereafter, while a next column is selected, one row at a time can be selected to separately determine and store a value for each of the PDs in that column that is indicative of the amount of light detected by the PD. This can be repeated for each of the columns.

Figure 6:
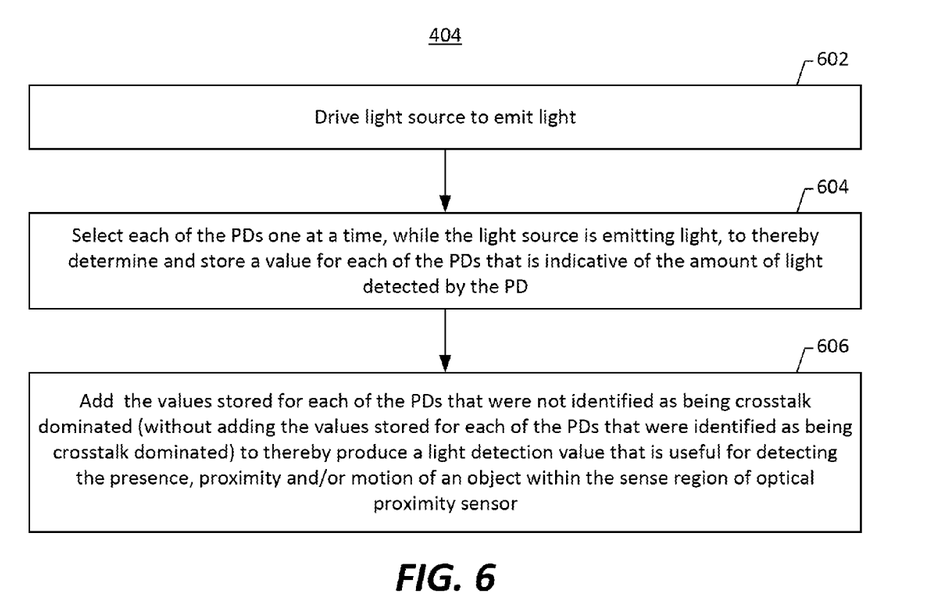

FIG. 6 is a high level flow diagram that is used to describe additional details of step 404, introduced in FIG. 4, according to an embodiment. Each of the steps described with reference to FIG. 6 are performed during the operational mode of the optical proximity sensor. Referring to FIG. 6, step 602 involves driving the light source to emit light. Step 604 involves selecting each of the PDs of the light detector one at a time, while the light source is emitting light, to thereby determine and store a value for each of the PDs of the light detector that is indicative of the amount of light detected by the PD. Step 604 can be performed, e.g., using the components shown in FIG. 3, but are not limited thereto. Step 606 involves adding the values stored for each of the PDs that were not identified as being crosstalk dominated (without adding the values stored for each of the PDs that were identified as being crosstalk dominated) to thereby produce a light detection value that is useful for detecting the presence, proximity and/or motion of an object within the sense region of optical proximity sensor. Since values stored at step 604 for PDs that were identified as being crosstalk dominated are not added at step 606 (to produce the light detection value), it is not necessary to even store values for the crosstalk dominated PDs. In other words, in an embodiment, step 604 can involve selecting each of the PDs that were not identified as being crosstalk dominated one at a time, while the light source is emitting light, to thereby determine and store a value for each of the PDs that were not identified as being crosstalk dominated, wherein the value is indicative of the amount of light detected by the PD.

Figure 7:
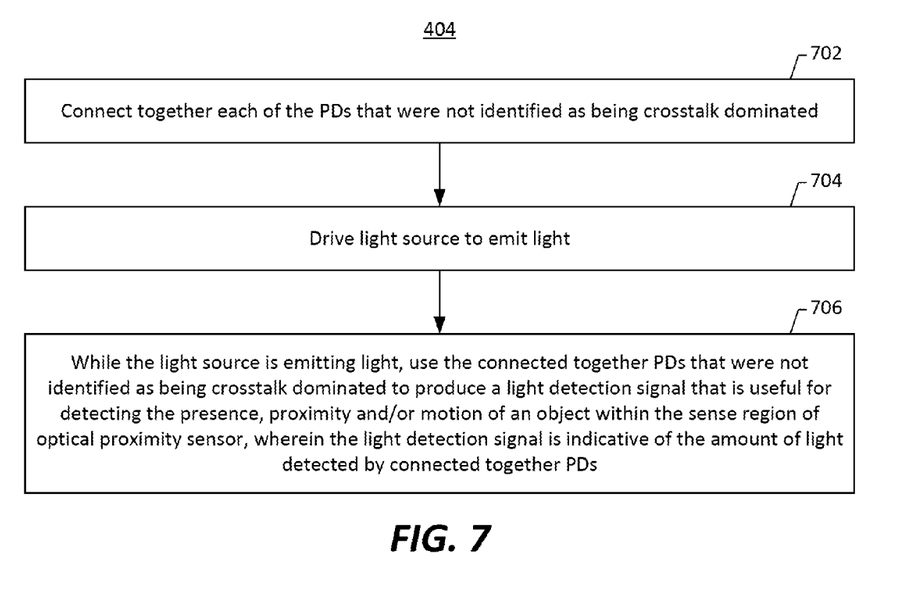

FIG. 7 is a high level flow diagram that is used to describe additional details of step 404, introduced in FIG. 4, according to another embodiment. Each of the steps described with reference to FIG. 7 are performed during the operational mode of the optical proximity sensor. Referring to FIG. 7, step 702 involves connecting together each of the PDs that were not identified as being crosstalk dominated. This way the PDs that are not crosstalk dominated essentially function as one large PD. The PDs that are crosstalk dominated are not connected to the PDs that are not crosstalk dominated, and thus, do not contribute to the response of the one large PD. Step 704 involves driving the light source to emit light. Step 706 involves, while the light source is emitting light, using the connected together PDs that were not identified as being crosstalk dominated (i.e., that are not crosstalk dominated) to produce a light detection signal that is useful for detecting the presence, proximity and/or motion of an object within the sense region of optical proximity sensor, wherein the light detection signal is indicative of the amount of light detected by connected together PDs.

Figure 8:
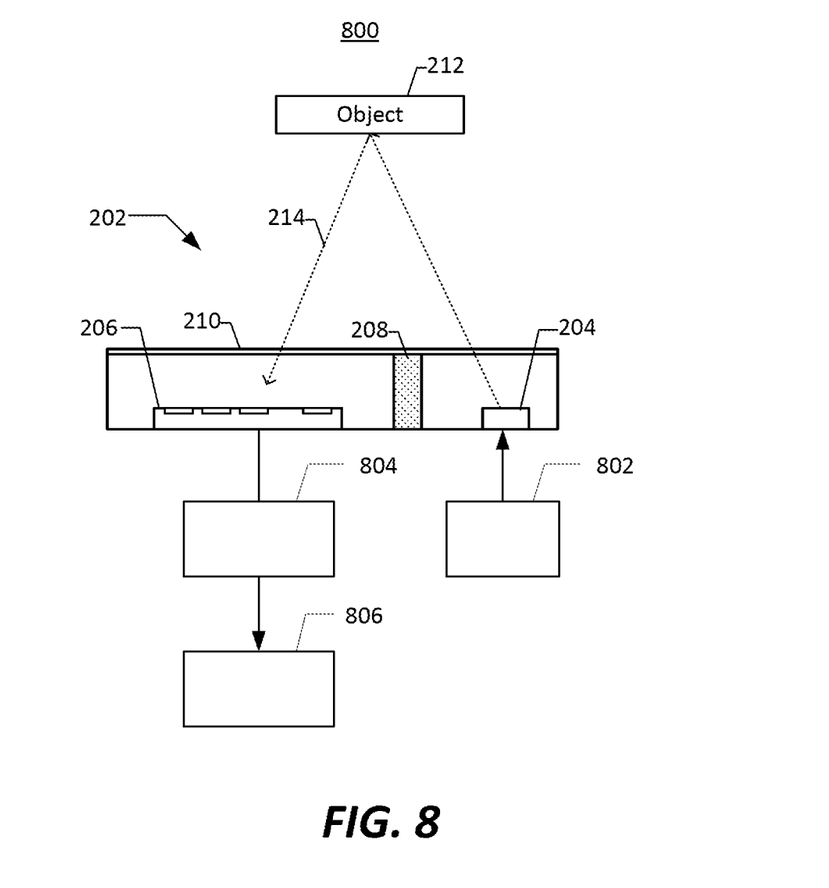
FIG. 8 is a high level block diagram of a system including an optical proximity sensor according to an embodiment of the present invention.

Optical proximity sensors of embodiments of the present invention can be used in various systems, including, but not limited to, cell-phones and handheld-devices. Referring to the system 800 of FIG. 8, for example, the optical proximity sensor 202 can be used to control whether a subsystem 806 (e.g., a touch-screen, display, backlight, virtual scroll wheel, virtual keypad, navigation pad, a camera, another sensor, a central processing unit (CPU), a mechanical actuator, etc.) is enabled or disabled. For example, the optical proximity detector can detect when an object (e.g., 212), such as a person's finger, is approaching, and based on the detection either enable (or disable) a subsystem 806. More specifically, an output of the proximity detector 202 can be provided to a comparator or processor 804 which can, e.g., compare the output of the proximity detector to a threshold, to determine whether the object is within a range where the subsystem 806 should be enabled (or disabled, depending on what is desired). Multiple thresholds (e.g., stored digital values) can be used, and more than one possible response can occur based on the detected proximity of an object. For example, a first response can occur if an object is within a first proximity range, and a second response can occur if the object is within a second proximity range. Exemplary responses can include starting various system and/or subsystem operations. In FIG. 8, the block 802 represents a driver that selectively drive the light source 204 to emit light. As mentioned above, such a driver can be included as part of the optical proximity sensor 202, or can be external to the optical proximity sensor.

In the above described FIGS., an opaque barrier 208 was shown as separating the light source 204 and the light detector 206. In alternative embodiments, the opaque barrier 208 can be eliminated. Where the opaque barrier 208 is eliminated, it is likely that more PDs will be identified as being crosstalk dominated, than if the opaque barrier 208 were included. Nevertheless, using techniques described herein, an optical proximity sensor without an opaque barrier separating the light source and the light detector can be configured to have a satisfactory SNR.

Optical proximity sensors, methods for use therewith, and systems including optical proximity sensor are described above. Such optical proximity sensors include a light source and a light detector, wherein the light detector includes a plurality of individually selectable photodiodes (PDs). During a calibration mode, individual PDs of the plurality of PDs of the light detector are tested to identify which PDs, if any, are crosstalk dominated. During an operation mode, the PDs of the light detector that were not identified as being crosstalk dominated are used to produce a light detection value or signal that is useful for detecting the presence, proximity and/or motion of an object within the sense region of the optical proximity sensor. By not using the PDs that were identified as being crosstalk dominated, the signal-to-noise ratio of the light detection value or signal is improved compared to if the crosstalk dominated PDs were also used.

While various embodiments of the present invention have been described above, it should be understood that they have been presented by way of example, and not limitation. It will be apparent to persons skilled in the relevant art that various changes in form and detail can be made therein without departing from the spirit and scope of the invention.

The breadth and scope of the present invention should not be limited by any of the above-described exemplary embodiments, but should be defined only in accordance with the following claims and their equivalents.

What is claimed is:

1. A method for use with an optical proximity sensor, including a light source and a light detector, wherein the light detector includes a plurality of individually selectable photodiodes (PDs), the method comprising:
   (a) during a calibration mode, identifying which individual PDs of the plurality of PDs of the light detector are optical crosstalk dominated; and
   (b) during an operation mode, using the PDs of the light detector that were not identified as being optical crosstalk dominated, and not using the PDs of the light detector that were identified as being optical crosstalk dominated, to produce a light detection value or signal that is useful for detecting the presence, proximity and/or motion of an object within the sense region of the optical proximity sensor,
   wherein step (a) comprises during the calibration mode:
   (a.1) driving the light source to emit light while there is no object within a sense region of the optical proximity sensor and/or the light detector is covered by an opaque material;
   (a.2) selecting each of the PDs one at a time, while the light source is emitting light, to thereby determine and store a value for each of the PDs that is indicative of the amount of light detected by the PD; and
   (a.3) identifying, based on the stored values, which individual PDs of the plurality of PDs of the light detector are optical crosstalk dominated.

2. The method of claim 1, wherein step (a.3) comprises:
   (a.3.i) comparing the stored values to a threshold value; and
   (a.3.ii) identifying, as being optical crosstalk dominated, each of the PDs whose stored value exceeds the threshold.

3. The method of claim 2, wherein the threshold is a predetermined fixed value or a programmable value.

4. The method of claim 2, further comprising:
   determining a value that corresponds to a dark current produced by a PD of the light detector; and
   determining the threshold value based on the value that corresponds to the dark current.

5. The method of claim 1, wherein step (b) comprises during the operational mode, deactivating or ignoring the PDs that were identified, during the calibration mode, as being optical crosstalk dominated.

6. The method of claim 1, wherein step (b) comprises during the operational mode:
   (b.1) driving the light source to emit light;
   (b.2) selecting each of the PDs of the light detector one at a time, while the light source is emitting light, to thereby determine and store a value for each of the PDs of the light detector that is indicative of the amount of light detected by the PD; and
   (b.3) adding the values stored for each of the PDs that were not identified as being optical crosstalk dominated to thereby produce a light detection value that is useful for detecting the presence, proximity and/or motion of an object within the sense region of optical proximity sensor.

7. The method of claim 1, wherein step (b) comprises during the operational mode:
(b.1) driving the light source to emit light;
(b.2) selecting each of the PDs that were not identified as being optical crosstalk dominated one at a time, while the light source is emitting light, to thereby determine and store a value for each of the PDs that were not identified as being optical crosstalk dominated, wherein the value is indicative of the amount of light detected by the PD; and
(b.3) adding the values stored for each of the PDs that were not identified as being optical crosstalk dominated to thereby produce a light detection value that is useful for detecting the presence, proximity and/or motion of an object within the sense region of optical proximity sensor.

8. The method of claim 1, wherein step (b) comprises during the operational mode:
(b.1) connecting together each of the PDs that were not identified as being optical crosstalk dominated;
(b.2) driving the light source to emit light; and
(b.3) while the light source is emitting light, using the connected PDs that were not identified as being optical crosstalk dominated to produce a light detection signal that is useful for detecting the presence, proximity and/or motion of an object within the sense region of optical proximity sensor, wherein the light detection signal is indicative of the amount of light detected by connected together PDs.

9. The method of claim 1, further comprising:
(c) during the operational mode using the light detection value or signal produced at step (b) to detect the presence, proximity and/or motion of an object within the sense region of the optical proximity sensor; and
(d) during the operational mode selecting a response or action in dependence on the presence, proximity and/or motion of an object within the sense region of the optical proximity sensor as detected at step (c).

10. An optical proximity sensor, comprising:
a light source that is selectively driven to emit light;
a light detector including a plurality of individually selectable photodiodes (PDs); and
a controller configured to identify, during a calibration mode, which individual PDs of the plurality of PDs of the light detector are optical crosstalk dominated, and cause, during an operational mode, a light detection value or signal to be produced using the PDs of the light detector that were not identified as being optical crosstalk dominated, and not using the PDs of the light detector that were identified as being optical crosstalk dominated,
wherein the light detection value or signal is useful for detecting the presence, proximity and/or motion of an object within the sense region of the optical proximity sensor;
an opaque barrier between the light source and the light detector;
a driver that selectively drives the light source to emit light; and
memory or registers;
wherein the controller is configured to, during the calibration mode cause the light source to be driven by the driver to emit light while there is no object within a sense region of the optical proximity sensor and/or the light detector is covered by the opaque barrier, cause each of the PDs to be selected one at a time while the light source is emitting light, to thereby determine and store in the memory or registers a value for each of the PDs that is indicative of the amount of light detected by the PD; and
identify, based on the stored values, which individual PDs of the plurality of PDs of the light detector are optical crosstalk dominated.

11. The optical proximity sensor of claim 10, wherein the controller is configured to, during the calibration mode, compare the stored values to a threshold value, and identify as being optical crosstalk dominated each of the PDs whose stored value exceeds the threshold.

12. The optical proximity sensor of claim 10, the controller is configured to, during the operational mode, cause the light source to be driven to emit light;
cause each of the PDs of the light detector to be individually selected one at a time, while the light source is emitting light, to thereby determine and store a value for each of the PDs of the light detector that is indicative of the amount of light detected by the PD; and
add the values stored for each of the PDs that were not identified as being optical crosstalk dominated to thereby produce a light detection value that is useful for detecting the presence, proximity and/or motion of an object within the sense region of optical proximity sensor.

13. The optical proximity sensor of claim 10, wherein the controller is configured to, during the operational mode, cause the light source to be driven to emit light;
cause each of the PDs of the light detector that were not identified as being optical crosstalk dominated to be individually selected one at a time, while the light source is emitting light, to thereby determine and store a value for each of the PDs of the light detector that were not identified as being optical crosstalk dominated, wherein the value is indicative of the amount of light detected by the PD; and
add the values stored for each of the PDs that were not identified as being optical crosstalk dominated to thereby produce a light detection value that is useful for detecting the presence, proximity and/or motion of an object within the sense region of optical proximity sensor.

14. The optical proximity sensor of claim 10, wherein the controller is configured to, during the operational mode, cause the light source to be driven to emit light;
cause each of the PDs that were not identified as being optical crosstalk dominated to be connected together so that the connected together PDs that were not identified as being optical crosstalk dominated can be used to produce a light detection signal that is useful for detecting the presence, proximity and/or motion of an object within the sense region of optical proximity sensor, wherein the light detection signal is indicative of the amount of light detected by connected together PDs.

15. A system, comprising:
a light source that is selectively driven to emit light;
a driver to selectively drive the light source;
a light detector including a plurality of individually selectable photodiodes (PDs);
a controller configured to identify, during a calibration mode, which individual PDs of the plurality of PDs of the light detector are optical crosstalk dominated, and cause, during an operational mode, a light detection value or signal to be produced using the PDs of the light detector that were not identified as being optical crosstalk dominated, and not using the PDs of the light detector that were identified as being optical crosstalk dominated, wherein the light detection value or signal is useful for detecting the presence, proximity and/or motion of an object within the sense region of the optical proximity sensor light detector an opaque barrier between the light source and the light detector; and memory or registers;

wherein the controller is configured to, during the calibration mode cause the light source to be driven by the driver to emit light while there is no object within a sense region of the optical proximity sensor and/or the light detector is covered by the opaque barrier, cause each of the PDs to be selected one at a time while the light source is emitting light, to thereby determine and store in the memory or registers a value for each of the PDs that is indicative of the amount of light detected by the PD; and identify, based on the stored values, which individual PDs of the plurality of PDs of the light detector are optical crosstalk dominated.

16. The system of claim 15, further comprising:
a subsystem capable of being enabled and disabled; and
a comparator or processor that receives the light detection value or signal and selectively enables or disables the subsystem in dependence thereon.

17. The system of claim 16, wherein the subsystem is selected from the group consisting of:
a touch-screen,
a display,
a backlight,
a virtual scroll wheel,
a virtual keypad,
a navigation pad,
a camera,
a sensor,
a central processing unit (CPU), or
a mechanical actuator.

* * * * *

UNITED STATES PATENT AND TRADEMARK OFFICE
CERTIFICATE OF CORRECTION

PATENT NO. : 9,772,398 B2  
APPLICATION NO. : 14/523202  
DATED : September 26, 2017  
INVENTOR(S) : Bikumandla et al.

Page 1 of 1

It is certified that error appears in the above-identified patent and that said Letters Patent is hereby corrected as shown below:

In the Specification

In Column 5, Line 50, delete "light sensor 206." and insert -- light detector 206. --, therefor.

In Column 6, Line 28, delete "ADC 312," and insert -- ADC 310, --, therefor.

In Column 6, Line 45, delete "ADC 312" and insert -- ADC 310 --, therefor.

In Column 7, Line 21, delete "and or" and insert -- and/or --, therefor.

In the Claims

In Column 11, Line 46, in Claim 10, delete "(PDs); and" and insert -- (PDs); --, therefor.

In Column 13, Line 10, in Claim 15, delete "detector" and insert -- detector; --, therefor.

Signed and Sealed this  
First Day of May, 2018

Andrei Iancu  
*Director of the United States Patent and Trademark Office*